(12) United States Patent
Yang et al.

(10) Patent No.: US 7,201,992 B2
(45) Date of Patent: Apr. 10, 2007

(54) FUEL CELL WITH PASSIVE WATER BALANCE

(75) Inventors: Deliang Yang, Torrance, CA (US); Jung S. Yi, Mansfield, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 236 days.

(21) Appl. No.: 10/750,609

(22) Filed: Dec. 31, 2003

(65) Prior Publication Data

US 2005/0142420 A1    Jun. 30, 2005

(51) Int. Cl.
*H01M 2/14* (2006.01)
(52) U.S. Cl. .......................................... 429/39; 429/38
(58) Field of Classification Search ...................... None
See application file for complete search history.

(56) References Cited

U.S. PATENT DOCUMENTS 4,652,502 A      3/1987   Breault et al.
5,686,199 A *   11/1997   Cavalca et al. ................ 429/30
5,858,569 A *    1/1999   Meacher et al. ............... 429/26
5,981,098 A *   11/1999   Vitale ............................ 429/34
6,316,135 B1    11/2001   Breault et al.
6,322,915 B1    11/2001   Collins et al.
6,379,833 B1 *   4/2002   Hill et al. ....................... 429/34
6,521,367 B2     2/2003   Reiser
6,794,077 B2 *   9/2004   Yi et al. ......................... 429/34

* cited by examiner

*Primary Examiner*—Patrick Joseph Ryan
*Assistant Examiner*—Julian Mercado
(74) *Attorney, Agent, or Firm*—Malcolm J. Chisholm, Jr.

(57) ABSTRACT

A fuel cell includes a membrane electrode assembly (46) having a first reactant flow field (80) secured adjacent a first or second surface (48, 50) of the assembly (46) for directing flow of a first reactant adjacent the first or second surface of the assembly (46). The first reactant flow field (80) defines a plurality of two-pass circuits (82, 84, 86, 88), and each two-pass circuit (82) is in fluid communication with both a first reactant inlet (90) for directing the first reactant into the fuel cell (12), and with a first reactant outlet (92) for directing the first reactant out of the fuel cell (12). The plurality of two-pass circuits (82) facilitate water movement (112) toward the reactant inlet (90) to aid in passive maintenance of fuel cell (12) water balance.

8 Claims, 2 Drawing Sheets

FUEL CELL WITH PASSIVE WATER BALANCE

TECHNICAL FIELD

The present invention relates to fuel cells that are suited for usage in transportation vehicles, portable power plants, or as stationary power plants, and the invention especially relates to a fuel cell than enhances water balance and that minimizes any need for active circulation of water.

BACKGROUND ART

Fuel cells are well known and are typically arranged in a fuel cell stack in cooperation with support systems to form a fuel cell power plant. Such plants are used to produce electrical current from hydrogen containing reducing fluid fuel and oxygen containing oxidant reactant streams to power electrical apparatus such as power plants and transportation vehicles. For fuel cells of the prior art to remain in water balance, it is known that an amount of water leaving the fuel cell must not be greater than an amount of water generated by the fuel cell during operation. Additionally, water must move into, move through, and diffuse and/or evaporate out of porous layers of the fuel cell at a stable rate in order to humidify dry reactant streams, to prevent drying out of a proton exchange membrane ("PEM") electrolyte, to remove heat generated by the fuel cells, and to perform other related tasks. Such water balance requirements are especially difficult to accomplish for fuel cells used in transportation vehicles wherein ambient temperatures vary from well-below the freezing temperature of water to over forty degrees centigrade ("$40°$ C.")

For example, when ambient air is hot and dry and is the oxygen containing oxidant stream, as the air enters the fuel cell at a very low relative humidity, water is readily evaporated into the oxidant stream from a fuel cell porous layer that defines an oxidant flow field, from other known porous support layers, and from any PEM electrolyte, etc. As the oxidant stream moves through the fuel cell, it is heated and additional fuel cell product water is also evaporated into the oxidant stream until it is saturated. When the oxidant stream nears a fuel cell oxidant outlet, water condenses out of the stream back into the porous fuel cell support layers. As disclosed in U.S. Pat. No. 6,322,915 that issued on Nov. 27, 2001 and in U.S. Pat. No. 6,521,367 that issued on Feb. 18, 2003, (both Patents being owned by the owner of all rights in the present invention), considerable effort has been undertaken to maintain satisfactory water balance in such fuel cells by use of "electrolyte dry-out barriers" as well as by actively circulating a coolant stream adjacent reactant stream inlets and outlets and within coolant channels defined in the porous fuel cell support layers to enhance proper reactant stream humidity, heat removal, and transport of condensed fuel cell water.

Such solutions, however, involve considerable parasitic power to actively circulate a coolant stream; involve care in minimizing freeze-related problems of the coolant stream and fuel cell water; impose enhanced weight and volume requirements for the fuel cell power plant; and, require elaborate manufacturing effort and cost. Consequently, there is a need for a fuel cell that provides for passive water balance to minimize or eliminate active coolant circulating and related water management systems.

DISCLOSURE OF INVENTION

The invention is a fuel cell for generating electrical current from first and second reactant streams, such as from reducing fluid fuel and oxygen containing oxidant reactant streams. The fuel cell includes a membrane electrode assembly having a first reactant flow field secured adjacent a first surface of the membrane electrode assembly for directing flow of the first reactant adjacent the first surface of the assembly. A second reactant flow field is secured adjacent a second surface of the electrode membrane assembly for directing flow of the second reactant adjacent the second surface of the assembly. The first reactant flow field defines a plurality of two-pass circuits, and each two-pass circuit is in fluid communication with both a first reactant inlet for directing the first reactant into the fuel cell, and also in fluid communication with a first reactant outlet for directing the first reactant out of the fuel cell.

In a preferred embodiment, each two-pass circuit defines a width across the two-pass circuit, when divided by a cross-flow length of the first reactant flow field, that is greater than 0.1 and less than 0.5. The "width across the two-pass circuit" is a shortest distance across the two-pass circuit in a direction perpendicular to flow of the first reactant through the two-pass circuit, and the "cross-flow length of the first reactant flow field" is a shortest distance across the first reactant flow field in a direction perpendicular to flow of the first reactant through the first reactant flow field.

In an additional embodiment, the first reactant flow field is a cathode flow field for directing an oxygen containing oxidant reactant stream through the fuel cell adjacent the first surface of the membrane electrode assembly. In an alternative embodiment, the first reactant flow field is an anode flow field for directing flow of a reducing fluid reactant stream through the fuel cell. In a further embodiment, the second reactant flow field also defines a plurality of two-pass circuits. In an optimal embodiment, the number of two-pass circuits in each reactant flow field is greater than or equal to 2 and less than 10. Also, the width across the two-pass circuit divided by a parallel-flow length of the two-pass circuit is greater than 0.3 and less than 1.0. The "parallel-flow length of the two-pass circuit" is one-half of a shortest distance along a two-pass circuit from a point of entry of the reactant stream into the circuit to a point of exit of the reactant stream from the circuit in a direction parallel to flow of the stream through the circuit.

Because the first reactant flow field defines a plurality of two-pass circuits, an effective distance is significantly reduced between a reactant outlet and a reactant inlet. Consequently, the condensed water that moves from the saturated reactant stream near the outlet into adjacent porous support layers is able to readily "wick" or move by capillary action through open pores into the nearby porous support layers adjacent the reactant stream inlet. By thus facilitating passive movement of the water from a condensation zone adjacent the reactant outlet into an evaporation zone adjacent the reactant inlet, in preferred embodiments of the invention, it is not necessary to define water channels to actively circulate water from the condensation zone to the evaporation zone. Consequently, by the improved design of the reactant flow field, the fuel cell achieves a passive water balance. By minimizing a need for active circulation of a water stream and/or fuel cell water, a total volume of fuel cell water during operation is reduced which facilitates operation of the fuel cell in ambient temperatures below the freezing temperature of water.

Accordingly, it is a general purpose of the present invention to provide a fuel cell with passive water balance that overcomes deficiencies of the prior art.

It is a more specific purpose to provide a fuel cell with passive water balance that minimizes a need for active circulation of fuel cell water, and that minimizes a quantity of fuel cell water within the fuel cell.

These and other purposes and advantages of the present fuel cell with passive water balance will become more readily apparent when the following description is read in conjunction with the accompanying drawings.

DESCRIPTION OF THE PREFERRED EMBODIMENTS

Figure 1:
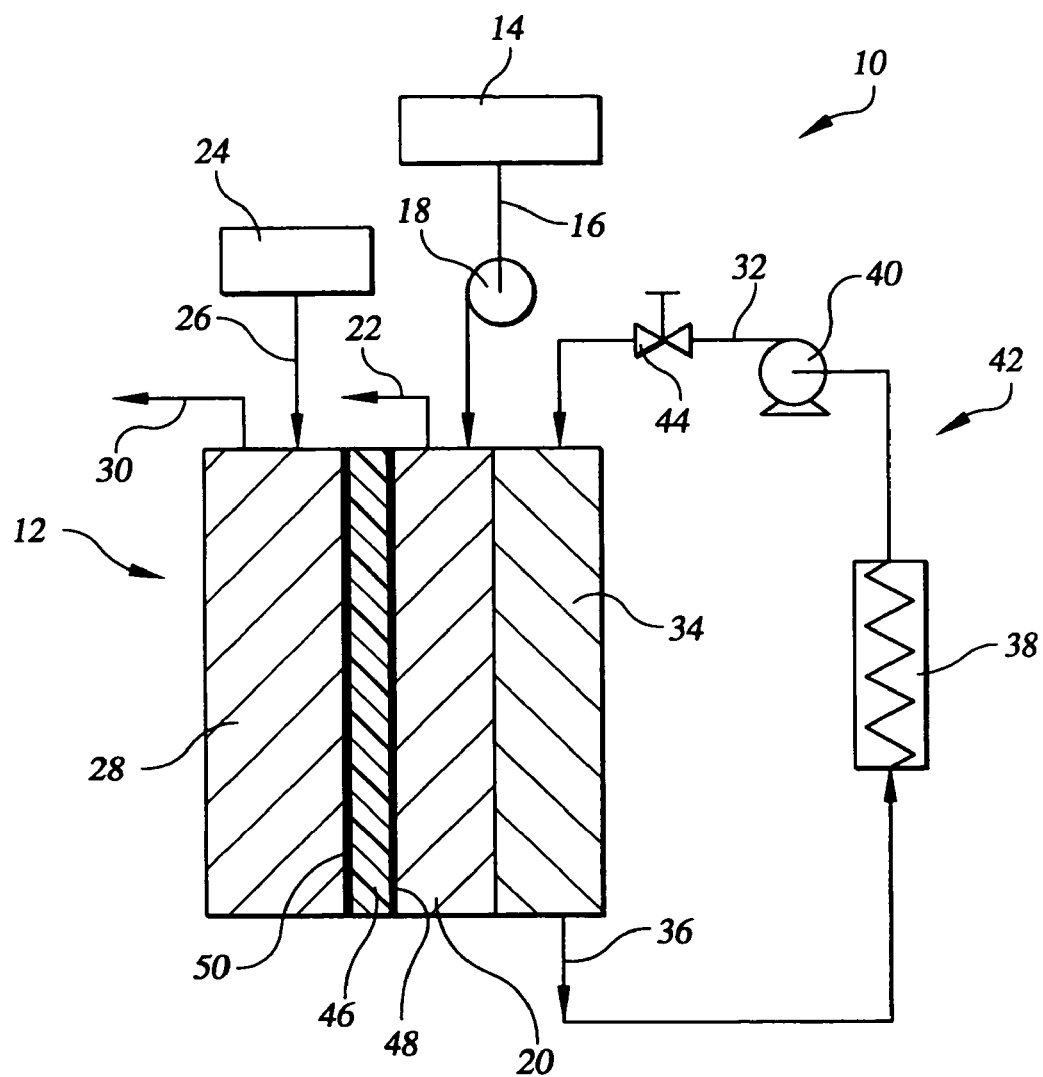
FIG. 1 is a simplified, schematic view of a fuel cell power plant including a fuel cell of the present invention.

Referring to the drawings in detail, a simplified fuel cell power plant 10 is shown in FIG. 1 including at least one fuel cell 12 that is constructed in accordance with the present invention and is generally represented by the reference numeral 12. The fuel cell 12 produces electrical power from first and second reactant streams, such as oxygen containing oxidant and hydrogen containing reducing fluid reactant streams, as is known. The first reactant such as an oxidant is directed from an oxidant supply 14 through an oxidant supply line 16 that may include a blower 18 into a first reactant or cathode flow field 20 of the fuel cell 12 and out of the fuel cell 12 through an oxidant vent 22. Similarly, a second reactant such as a reducing fluid is directed from a fuel supply 24 through a fuel supply line 26 into a second reactant or anode flow field 28 of the fuel cell 12 and out of the cell through a fuel vent 30.

The power plant 10 may also direct a coolant stream such as liquid water, a conventional antifreeze, or a "direct antifreeze solution" (as disclosed in co-owned U.S. Pat. No. 6,316,135) through a coolant feed line 32 and a coolant flow plate 34 secured adjacent the cathode flow field 20 in a well known manner, and out of the cell 12 in a coolant discharge line 36. The coolant discharge line 36 and coolant feed line 32 may be in fluid communication with a coolant heat exchanger 38 to cool the coolant fluid, such as an automotive radiator type of heat exchanger. A coolant pump 40 may be secured to the coolant feed line 32 to pump the coolant stream through the coolant flow field. The coolant feed line 32, flow plate 34, discharge line 36, coolant heat exchanger 38 and coolant pump 40 may characterized as a coolant loop 42, and the coolant loop 42 may include a pressure control valve 44 to control a pressure of the coolant stream within the coolant flow plate 34 to be below the pressure of the reactant streams, in a manner well known in the art and described in the aforesaid U.S. Pat. No. 6,322,915.

As is well known, the fuel cell 12 also includes a membrane electrode assembly 46 secured between the cathode and anode flow fields 20, 28 so that the cathode flow field 20 is adjacent a first surface 48 or a cathode electrode 48 of the assembly 46. The anode flow field 28 is secured adjacent an opposed second surface 50 or anode electrode 50 of the assembly 46. The membrane electrode assembly may include a proton exchange membrane ("PEM") electrolyte as is well known in the art secured to opposed cathode and anode electrodes 48, 50.

Figure 2:
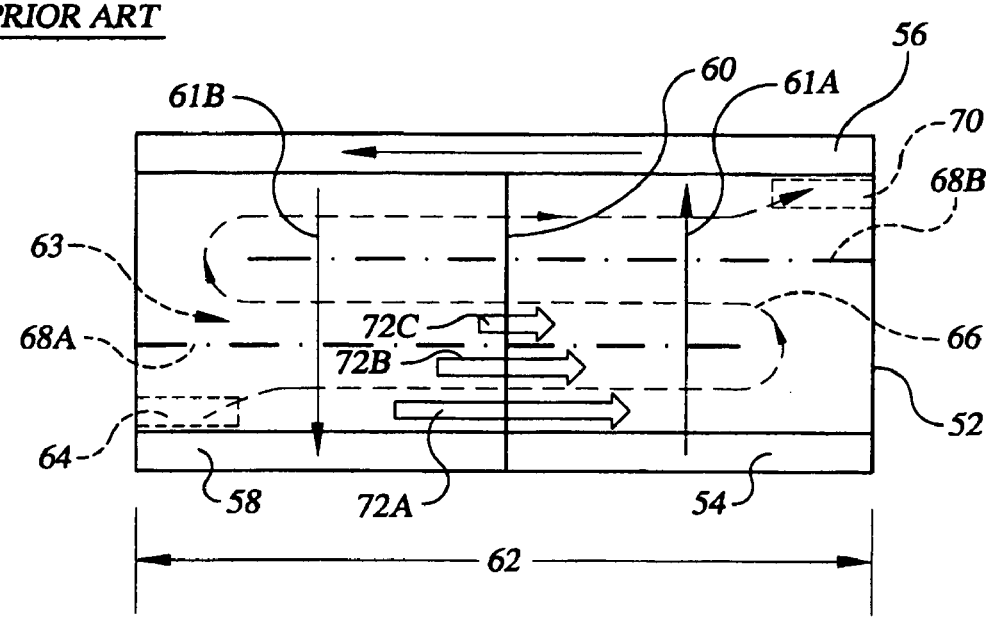
FIG. 2 is a simplified, schematic, cross-sectional representation showing a prior art reactant flow field of a fuel cell.

FIG. 2 shows a prior art reactant flow field 52 that would be appropriate for directing a first or second reactant stream through a prior art fuel cell. The prior art reactant flow field 52 includes a reactant inlet 54, a reactant turn-around 56 and a reactant outlet 58, and a reactant two-pass divider 60 extending between the reactant inlet and outlet 54, 58 and the reactant turn-around 56 that defines two passes for flow of the reactant through the flow field 52. The described flow of a reactant stream along reactant flow lines 61A, 61B through the reactant flow field 52 defines a two-pass circuit 62 within the prior art reactant flow field 52. Shown in hatched lines in FIG. 2 is a prior art coolant flow field 63 adjacent the reactant flow field 52, including a coolant inlet 64, a coolant flow path 66, coolant flow dividers 68A, 68B, and a coolant outlet 70 for directing a coolant stream along the coolant flow path 66 between the coolant inlet and outlet 64, 70.

As a reactant stream, such as an oxidant stream of ambient air having a low relative humidity, enters the reactant inlet 54, and as is known, water will evaporate into the reactant stream from adjacent porous layers that define the reactant flow field 52. As the reactant stream passes through the reactant flow field 52 it is warmed and its relative humidity increases, until approaching the reactant outlet 58 water condenses out of the stream and back into the porous layers. The condensed water may then move by capillary action or "wicking" from a saturated condensation zone adjacent the reactant outlet toward the reactant inlet, as represented by water movement arrows 72A, 72B, 72C. Water movement arrow 72A is larger than 72B, or 72C to represent that more water is available near arrow 72A, because arrow 72A is closest to the reactant outlet 58. The farther from the reactant outlet, the less water condenses out of the reactant stream, such as represented by water movement arrow 72C. Because more water is available adjacent the reactant outlet 58, more water moves by capillary action toward the reactant inlet 54. However, adequate water may be unavailable adjacent the reactant inlet 54 leading to dry-out of adjacent porous layers, that may also lead to dry-out of a PEM electrolyte, leading to degraded performance of any fuel cell utilizing the prior art reactant flow field 52. This occurs because the average distance between the reactant flow lines 61A and 61B may be too long for water to be wicked at an acceptable rate from adjacent the reactant flow line 61B and adjacent the reactant outlet 58 to adjacent the reactant flow line 61A and adjacent the reactant inlet 54.

U.S. patent application Ser. No. 10/036,181, which has been published under Publication No. U.S. 2003/0124410 A1, with a publication date of Jul. 3, 2003, and which is owned by the owners of the invention described herein, teaches a fuel cell with passive water management. Such a fuel cell contains both water management channels and coolant channels. A water flow field may be necessary to transfer water adjacent the reactant outlet 58 to an area adjacent the reactant inlet 54.

Figure 3:
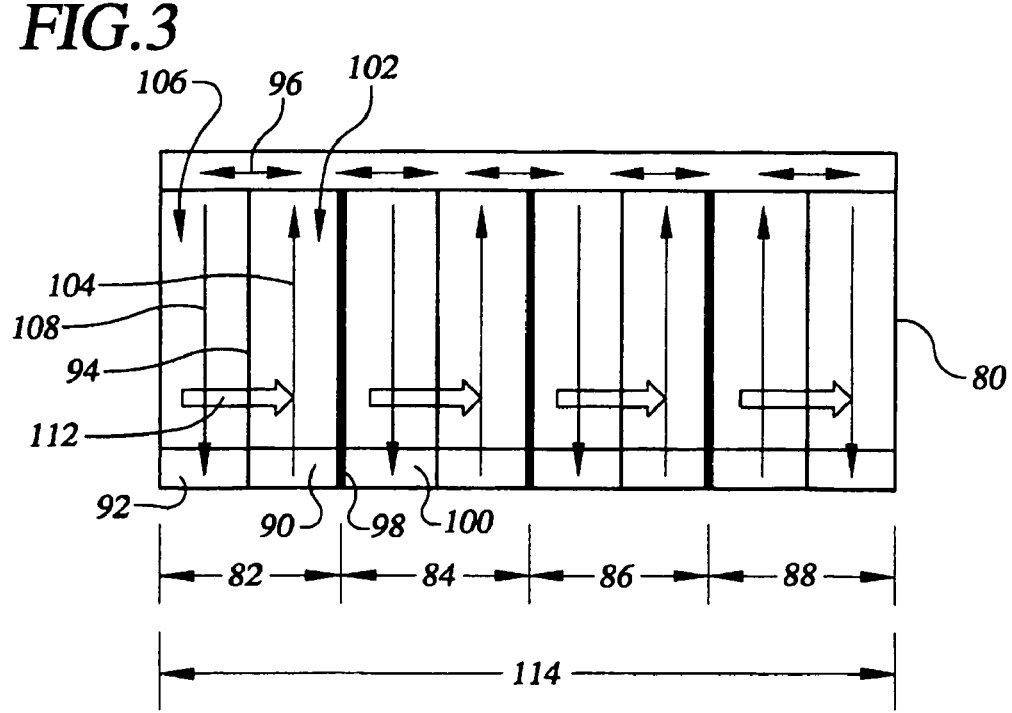
FIG. 3 is simplified, schematic, cross-sectional representation showing a first reactant flow field of a fuel cell constructed in accordance with the present invention.

FIG. 3 shows a first reactant flow field 80 appropriate for use in a fuel cell 12 of the present invention. The first reactant flow field 80 defines a plurality of two-pass circuits, including a first two-pass circuit 82, a second two-pass circuit 84, a third two-pass circuit 86, and a fourth two-pass circuit 88. (For convenience and efficiency, only the first 82 of the plurality of two-pass circuits will be described herein in detail, however the other two-pass circuits 84, 86, 88 include virtually identical components.) Each of the two-pass circuits, such as the first two-pass circuit 82, includes a first reactant inlet 90, an adjacent first reactant outlet 92, and a first reactant flow divider 94. The reactant flow divider 94 may consist of a wet seal formed within the porous substrate that is part of the cathode electrode 48 and anode electrode 50. Such a wet seal is described in co-owned U.S. Pat. No. 4,652,502. A wet seal has an advantage in that it creates a barrier to reactant short circuiting between a first reactant flow pass 102 and a second reactant flow pass 106; while permitting transport of water in the direction of a water movement arrow 112.

All of the two-pass circuits may share a common turn-around 96. A first two-pass separator 98 separates the first two-pass circuit 82 from an adjacent circuit, such as the second two-pass circuit 84, and also separates the first two-pass circuit's reactant inlet 90 from and adjacent outlet or inlet, such as an outlet 100 of the adjacent second two-pass circuit 84. The reactant flow divider 94 not only separates flow of the reactant stream within the first two-pass circuit, but it also divides the reactant inlet 90 from the reactant outlet 92. Consequently, each of the two-pass circuits 82, 84, 86, 88 are in fluid communication with separate reactant inlets and outlets as with the inlet 90 and outlet 92 of the first two-pass circuit 82. Therefore, flow of the reactant streams is not in series sequentially through the plurality of two-pass circuits 82, 84, 86, 88, but instead is in parallel flow through each circuit.

As shown in FIG. 3, in contrast to FIG. 2, there is a relatively short distance between a reactant stream passing within the first pass 102 adjacent directional arrow 104 and a reactant stream within the second pass 106 adjacent directional arrow 108 of the first two-pass circuit 82. That decreased distance between the first and second passes 102, 106 facilitates movement of water within porous layers adjacent the first and second passes 102, 106, as represented by the water movement arrow 112. Consequently, the multiple two-pass circuits 82, 84, 86, 88 facilitate movement of water within the porous layers defining the first reactant flow field 80 so that adequate water remains within the porous layers adjacent the first reactant inlet 90 and reactant inlets of the other two-pass circuits 84, 86, 88 as the reactant is entering the first reactant flow field 80. As is known in the art, the channels, dividers and separators that may be utilized to define the first reactant flow field 80 are typically defined within common porous layers of the components of the fuel cell 12, such as in the coolant flow plate 34 and adjacent cathode flow field 20, and as disclosed in the aforesaid U.S. Patents.

In a preferred embodiment, each of the plurality of two-pass circuits 82, 84, 86, 88 defines a width across each two-pass circuit, when divided by a cross-flow length 114 of the first reactant flow field, that is greater than 0.1 and less than 0.5. For purposes herein and as recited above, the width across the first two-pass circuit 82 is a shortest distance across the first two-pass circuit that is perpendicular to flow of a reactant through the first two-pass circuit 82, such as perpendicular to flow directional arrows 104, 108 in FIG. 3. Also for purposes herein, the phrase "cross-flow length of the first reactant flow field" 80 is a shortest distance across the first reactant flow field 80 in a direction that is perpendicular to flow of the reactant through the first reactant flow field 80. The cross-flow length of the first reactant flow field 80 is represented in FIG. 3 by the distance lines designated by reference numeral 114.

In an additional embodiment, the first reactant flow field is the cathode flow field 20 (shown in FIG. 1) for directing an oxidant stream through the fuel cell adjacent the cathode electrode 48. In an alternative embodiment, the anode flow field 58 may also define a plurality of two-pass circuits having dimensions as described above for the first two-pass circuit 82, which may be characterized herein for convenience as the first reactant flow field 80 is an anode flow field for directing flow of a reducing fluid reactant stream through the fuel cell 12 adjacent the anode electrode 50. In a further embodiment, both the first reactant flow field 20 and the second reactant flow field 28 may each define a plurality of two-pass circuits having dimensions as described above for the first two-pass circuit 82.

In an optimal embodiment, the first reactant flow field 80 is a cathode flow field 20. In such an embodiment, the number of two-pass circuits 82, 84, 86, 88 in each reactant flow field is greater than or equal to 2 and less than 10. Also, the width across a two-pass circuit 82 divided by a parallel-flow length of the two-pass circuit 82 is greater than 0.3 and less than 1.0. The "parallel-flow length of the two-pass circuit" is one-half of a shortest distance along a two-pass circuit 82 from a point of entry of the reactant stream into the circuit 82 to a point of exit of the reactant stream from the circuit 82 in a direction parallel to flow of the stream through the circuit 82, such as parallel to flow directional arrows 104, 108.

As is apparent, by the first reactant flow field 80 including a plurality of two-pass circuits 82, 84, 86, 88, the fuel cell 12 is able to achieve enhanced water balance while minimizing or eliminating need for active circulation of a water stream through the fuel cell 12.

All of the aforementioned U.S. Patents are incorporated herein by reference.

While the present invention has been disclosed with respect to the described and illustrated embodiments of the fuel cell 12 with the described first reactant flow field 80, it is to be understood that the invention is not to be limited to those embodiments. Accordingly, reference should be made primarily to the following claims rather than the foregoing description to determine the scope of the invention.

What is claimed is:

1. A fuel cell (12) for generating electrical current from first and second reactant streams, comprising:
    a. a membrane electrode assembly (46);
    b. a first reactant flow field (80) secured adjacent a surface selected from the group consisting of a first surface (48) and a second surface (50) of the membrane electrode assembly (46) for directing flow of a first reactant adjacent the selected surface (48, 50) of the assembly (46);
    c. wherein the first reactant flow field (80) defines a plurality of two-pass circuits (82, 84, 86, 88), each two-pass circuit being in fluid communication with a first reactant inlet (90) for directing the first reactant into the fuel cell (12), and in fluid communication with a first reactant outlet (92) for directing the first reactant out of the fuel cell (12); and,
    d. wherein the reactant flow field (80) defines a common turn-around (96) in fluid communication with each two-pass circuit (82, 84, 86, 88), and the common turn-around (96) being defined between the first reactant inlet (90) and the first reactant outlet (92) so that the first reactant flowing from the first reactant inlet (90) to the first reactant outlet (92) passes through the common turn-around (96) and raises within the common turn around (96) with the first reactant passing through the other of the plurality of two-pass circuits (84, 86, 88).

2. The fuel cell (12) of claim 1, wherein each two-pass circuit (82, 84, 86, 88) defines a width across the two-pass circuit (82), when divided by a cross-flow length (114) of the first reactant flow field, that is greater than 0.1 and less than 0.5, wherein the width across each two-pass circuit (82) is a shortest distance across the two-pass circuit (82) in a direction perpendicular to flow of the first reactant through the two-pass circuit (82), and the crossflow length (114) of the first reactant flow field (80) is a shortest distance across the first reactant flow field (80) in a direction perpendicular to flow of the first reactant through the flow field (80).

3. The fuel cell (12) of claim 1, wherein the first reactant flow field (80) is a cathode flow field (20) for directing flow of an oxygen containing oxidant reactant adjacent the selected surface (48) of the membrane electrode assembly.

4. The fuel cell (12) of claim 1, wherein the first reactant flow field (80) is an anode flow field (28) for directing flow of a hydrogen containing reducing fluid adjacent the selected surface (50) of the membrane electrode assembly.

5. The fuel cell (12) of claim 1, further comprising a second reactant flow field (28) secured adjacent the first or second surface (48, 50) for directing flow of a second reactant adjacent the first or second surface (48, 50), wherein the second reactant flow field (28) defines a plurality of two-pass circuits (82, 84, 86, 88), each two-pass circuit being in fluid communication with a reactant inlet (90) for directing the second reactant into the fuel cell (12), and in fluid communication with a reactant outlet (92) for directing the second reactant out of the fuel cell (12).

6. The fuel cell (12) of claim 1, wherein the first reactant flow field (80) is a cathode flow field (20), the number of two-pass circuits (82, 84, 86, 88) in each reactant flow field is greater than or equal to 2 and less than 10, a width across a two-pass circuit (82) divided by a parallel-flow length of the two-pass circuit (82) is greater than 0.3 and less than 1.0, wherein the parallelflow length of the two-pass circuit (82) is one-half of a shortest distance along the two-pass circuit (82) from a point of entry of the reactant stream into the circuit (82) to a point of exit of the reactant stream from the circuit (82) in a direction parallel to flow of the stream through the circuit (82).

7. A method of managing water within a fuel cell (12) comprising the steps of:

a. securing a first reactant flow field (80) within a fuel cell (12) adjacent a surface of a membrane electrode assembly (46) selected from the group consisting of a first surface (48) and a second surface (50) of the assembly (46); and, b. directing a first reactant to flow through a plurality of two-pass circuits (82, 84, 86, 88) defined within the first reactant flow field (80); and, c. directing the first reactant to flow from reactant inlets (90) of the two-pass circuits (82, 84, 86, 88) through a common turn-around (96) defined within the reactant flow field (80), then mixing the first reactants from the reactant inlets (90) within the common turnaround (96), and then directing the first reactant to flow from the common turn-around (96) through reactant outlets (92) of the two-pass circuits (82, 84, 86, 88.

8. A fuel cell (12) for generating electrical current from first and second reactant streams, comprising:

a. a membrane electrode assembly (46);

b. a first reactant flow field (80) secured adjacent a surface selected from the group consisting of a first surface (48) and a second surface (50) of the membrane electrode assembly (46) for directing flow of a first reactant adjacent the selected surface (48, 50) of the assembly (46);

c. wherein the, first reactant flew field (80) defines a plurality of two-pass circuits (82, 84, 86, 88) defined within porous layers of the flow field (80), each two-pass circuit being in fluid communication with a first reactant inlet (90) for directing the first reactant into the fuel cell (12), and in fluid communication with a first reactant outlet (92) for directing the first reactant out of the fuel cell (12); and, d. wherein the first reactant flow field (80) defines a common turn-around (96) in fluid communication with each two-pass circuit (82, 84, 86, 88), and the common turn-around (96) being defined between the first reactant inlet (90) and the first reactant outlet (92) so that the first reactant flowing from the first reactant inlet (90) to the first reactant outlet (92) passes through the common turnaround (96) and mixes within the common turn around (96) with the first reactant passing through the other of the plurality of two-pass circuits (84, 86, 88).

\* \* \* \* \*

UNITED STATES PATENT AND TRADEMARK OFFICE
CERTIFICATE OF CORRECTION

| | | |
|---|---|---|
| PATENT NO. | : 7,201,992 B2 | Page 1 of 1 |
| APPLICATION NO. | : 10/750609 | |
| DATED | : April 10, 2007 | |
| INVENTOR(S) | : Yang et al. | |

It is certified that error appears in the above-identified patent and that said Letters Patent is hereby corrected as shown below:

Column 6, line 64, the word "raises" should be deleted and replaced with --mixes--.

Signed and Sealed this

Tenth Day of July, 2007

JON W. DUDAS
*Director of the United States Patent and Trademark Office*